United States Patent [19]

Echigo et al.

[11] Patent Number: 5,915,046
[45] Date of Patent: Jun. 22, 1999

[54] SYSTEM FOR AND METHOD OF PROCESSING DIGITAL IMAGES

[75] Inventors: Tomio Echigo, Yokohama; Junji Maeda, Tokyo-to; Jung-Kook Hong, Tokyo-to; Mikihiro Ioka, Tokyo-to, all of Japan

[73] Assignee: International Business Machines Corporation, Armonk, N.Y.

[21] Appl. No.: 08/706,550

[22] Filed: Sep. 6, 1996

[30] Foreign Application Priority Data

Sep. 6, 1995 [JP] Japan .................................. 7-228680

[51] Int. Cl.$^6$ .............................. G06K 9/36; H04N 1/41; H04N 1/415; H04N 1/40
[52] U.S. Cl. ......................... 382/248; 382/174; 382/232; 382/233; 358/426; 358/427; 358/433; 358/448; 358/453
[58] Field of Search .................................... 358/426, 430, 358/433, 447, 448, 450, 457, 261.1, 261.2, 453; 382/232, 233, 240, 241, 242, 243, 130, 238, 239, 248, 174

[56] References Cited

U.S. PATENT DOCUMENTS

| 3,905,045 | 9/1975 | Nickel ..................................... 382/130 |
| 4,947,447 | 8/1990 | Miyaoka et al. ........................ 382/240 |
| 5,282,255 | 1/1994 | Bovik et al. ............................. 382/238 |
| 5,363,107 | 11/1994 | Gertz et al. ............................. 382/238 |

*Primary Examiner*—Edward L. Coles
*Assistant Examiner*—Mark Wallerson
*Attorney, Agent, or Firm*—Ronald L. Drumheller

[57] ABSTRACT

An encoding method is provided with which users can select picture quality and a quantity of data in multiple stages and with which an image of higher picture quality can be regenerated by scalable selection, i.e., by further adding data to compressed data that can be decoded. Image data is compressed using: means (62) for segmenting an original image into a plurality of object regions where each region pixels all correlate with one another and for determining a hierarchical structure of the object regions; means (63) for approximating each of the object regions with at least one polygonal surface so that errors of a intensity of luminance and chrominances in each the pixel are less than a predetermined threshold value; means (64) for obtaining residual images by subtracting the approximated image from the original image or by subtracting a decompressed image of a compressed nth-order residual image from the original nth-order residual image; means (65) for compressing the nth-order residual image ($n \geq 1$) by encoding; means (66) for storing the approximated image and the coded nth-order residual image; and means (67) for decompressing the compressed nth-order residual image from the nth-order residual image.

15 Claims, 4 Drawing Sheets

FIG.4
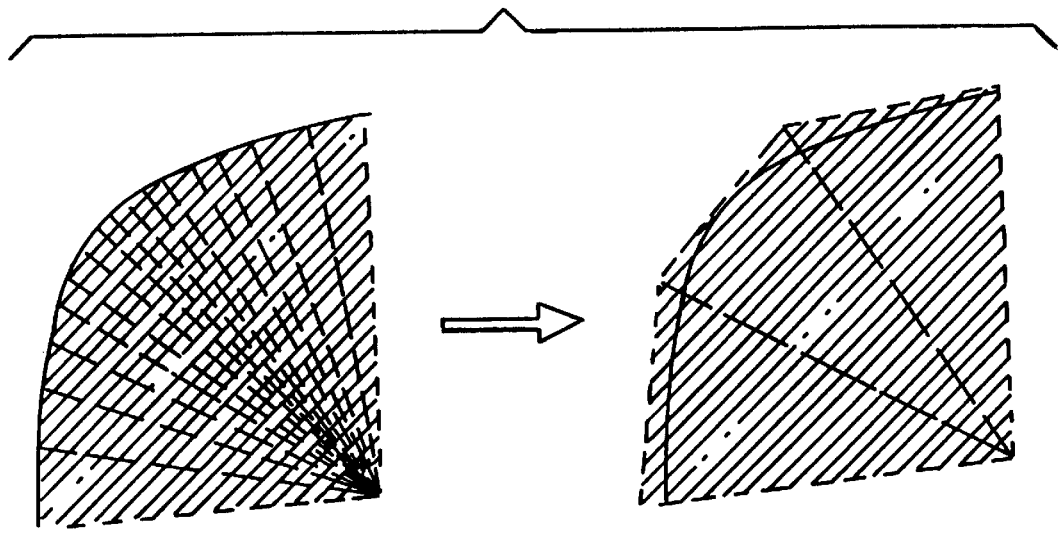
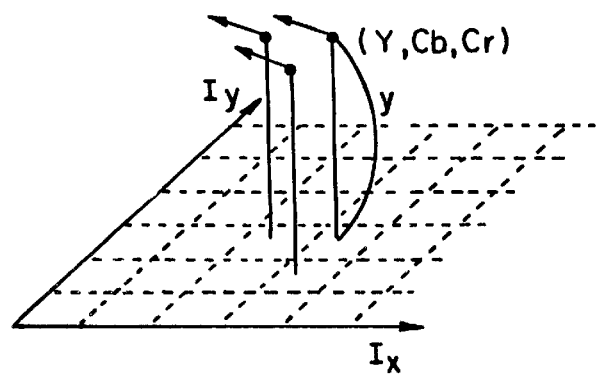
FIG.5(a)
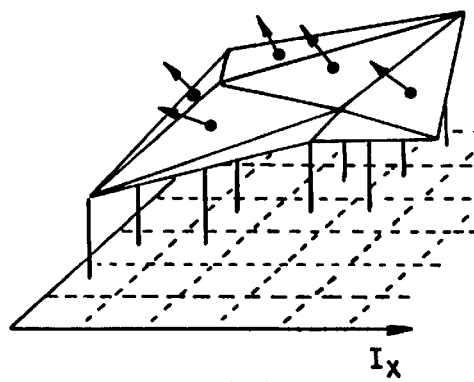
FIG.5(b)
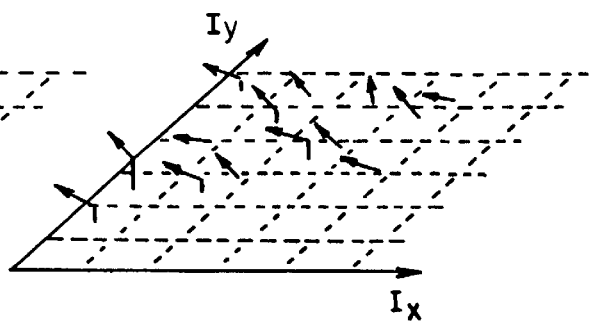
FIG.5(c)

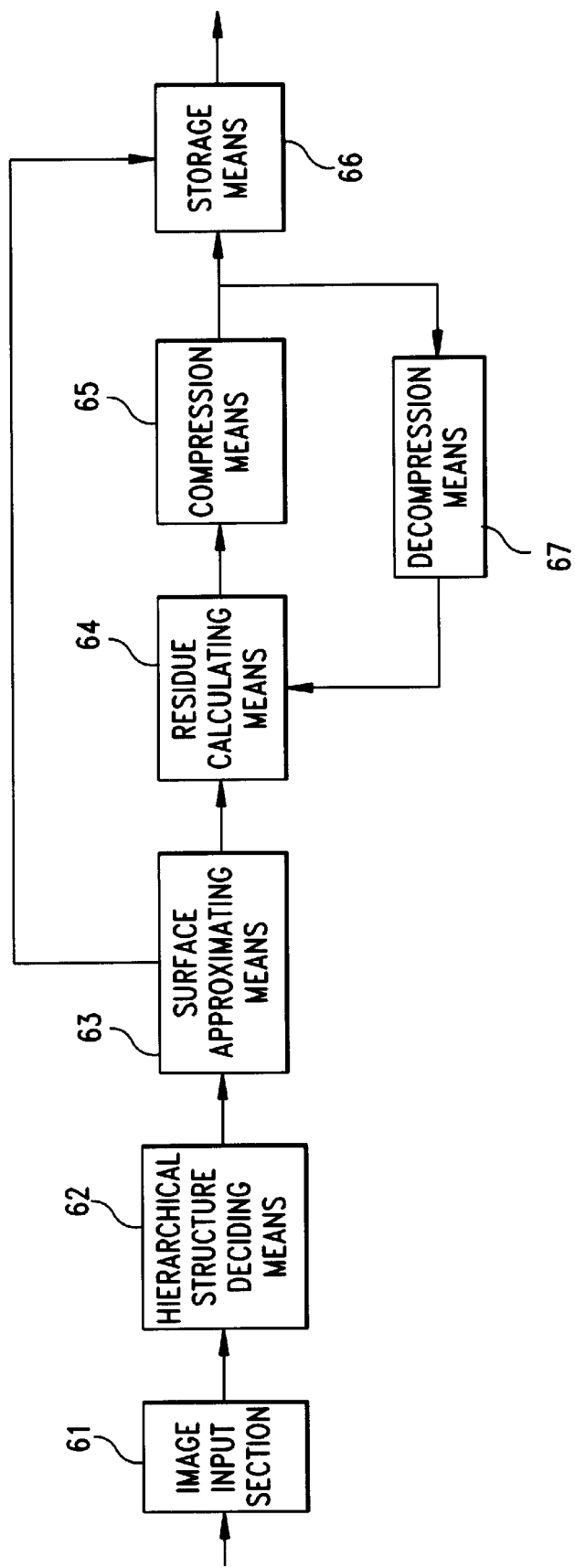

SYSTEM FOR AND METHOD OF PROCESSING DIGITAL IMAGES

BACKGROUND OF THE INVENTION

1. Field of the Invention

The present invention relates to a system and method for processing image data, and more particularly to an image compressing system and method where a digital image is segmented into a plurality of object regions and where the object regions are represented by a layered image representation.

2. Related Art

With the ever increasing popularity of multimedia, there is an increasing demand for a high accurate image processing technique having the same quality as printing or photography. The image data is massive in data quantity compared with sound data, etc., and as the image becomes more accurate, the data quantity is exponentially increased. Therefore, it is indispensable in the image processing arts to encode image data for compressing the image data.

For example, JPEG as an international standard is known for encoding a color still image. In this standard there is proposed an encoding method such as a method (lossy) where there is information loss but compressibility is good and a method (lossless) where an original image can be completely restored to the original state. The "lossy" method and the "lossless" method entirely differ in encoding. Therefore, when a lossy compressed image is desired to be converted to a lossless image of higher quality, users have to encode image data of entirely different format again with a different algorithm in spite of the same original image.

As described above, between the lossy method and the lossless method, the image data has so far been compressed with different formats. Therefore, user's burden is heavy because the user must encode image data of entirely different format with a different algorithm.

SUMMARY OF THE INVENTION

Accordingly, an objective of the present invention is to provide a novel data compressing method and a novel data compressing system which are capable of handling images based on lossy and lossless methods with a common data format.

Another objective of the present invention is to provide a method and a system which are capable of easily displaying an image with picture quality that users desire.

To achieve the foregoing objectives, in accordance with an important aspect of the present invention, there is provided a method of compressing image data, comprising the steps of:

(a) segmenting an original image into a plurality of object regions on the basis of a predetermined correlation so as to define a hierarchical structure of said object regions;

(b) approximating each of said object regions with at least one polygonal surface so that errors of intensities of luminance and chrominances in each said object region are less than a predetermined threshold value;

(c) obtaining a first-order residual image by subtracting the approximated image from said original image; and (d) encoding said first-order residual image.

In accordance with another important aspect of the present invention, there is provided a method of compressing image data, comprising the steps of:

(a) segmenting an original image into a plurality of object regions on the basis of a predetermined correlation so as to define a hierarchical structure of said object regions;

(b) approximating each of said object regions with at least one polygonal surface so that errors of intensities of luminance and chrominances in each said object region are less than a predetermined threshold value;

(c) obtaining a first-order residual image by subtracting the approximated image from said original image;

(d) encoding said first-order residual image; and (e) obtaining a second-order residual image by subtracting an image obtained by decompressing the encoded first-order residual image from said first-order residual image.

In accordance with still another important aspect of the present invention, there is provided a method of compressing image data, comprising the steps of:

(a) segmenting an original image into a plurality of object regions on the basis of a predetermined correlation so as to define a hierarchical structure based on the order of superimposition of said object regions;

(b) approximating each of said object regions with at least one polygonal surface so that errors of intensities of luminance and chrominances in each said object regions are less than a predetermined threshold value;

(c) obtaining a first-order residual image by subtracting the approximated image from said original image;

(d) encoding said first-order residual image;

(e) obtaining a second-order residual image by subtracting an image obtained by decompressing the encoded first-order residual image from said first-order residual image; and (f) recursively executing said step (d) and step (e) to obtain a high-order residual images in sequence.

In the aforementioned methods, it is preferable that the polygonal surface be a triangular surface.

In addition, each of the object regions other than the object region whose superimposition order is lowest has information about its contour configuration.

It is desirable in said step (b) that the object regions be approximated with a plurality of the polygonal surfaces so that the errors of intensity of luminance and chrominances in each of the polygonal surfaces are less than a predetermined threshold value.

Data may be supplemented in a corresponding area, in one object region, said corresponding area corresponding to an area where the other object region exists, said other object region being upper over said one object region, whereby said one object region is approximated with the polygonal surface independently of the contour configuration of said other object region.

The object region having said information about its contour configuration may be approximated with a plurality of polygonal surfaces protruding from said contour configuration.

In accordance with a further important aspect of the present invention, there is provided a system for compressing image data, comprising:

means for segmenting an original image into a plurality of object regions on the basis of a predetermined correlation so as to define a hierarchical structure of said object regions;

means for approximating each of said object regions with at least one polygonal surface so that errors of intensity of luminance and chrominances in each said object regions are less than a predetermined threshold value;

means for obtaining a first-order residual image by subtracting the approximated image from said original image;

means for compressing said nth-order residual image ($n \geq 1$) by encoding;

means for storing said approximated image and the coded nth-order residual image; and means for obtaining an (n+1)th-order residual image by subtracting an image obtained by decompressing the compressed nth-order residual image from said nth-order residual image.

In accordance with a further important aspect of the present invention, there is provided a method of decoding image data, comprising the steps of:

(a) segmenting an original image into a plurality of object regions on the basis of a predetermined correlation so as to define a hierarchical structure of said object regions, and decoding approximated data obtained by approximating each of said object regions with at least one polygonal surface so that errors of intensity of luminance and chrominances in each said object regions are less than a predetermined threshold value;

(b) decoding first-order residual image data obtained by subtracting the approximated image from said original image; and (c) adding the decoded first-order residual image to the decoded approximated data.

The aforementioned method may further comprise:

(d) decoding second-order residual image data obtained by subtracting an image obtained by decompressing the first-order residual image compressed, from said first-order residual image, and (e) adding the decoded second-order residual image data to the decoded approximated data and the decoded first-order residual image data.

The aforementioned method may further comprise (f) recursively executing said step (d) and said step (e) to decode high-order residual image data and add the decoded high-order residual image data to the already decoded approximated data and the already decoded residual image data.

BRIEF DESCRIPTION OF THE DRAWINGS

FIG. 4 is a schematic view showing a hierarchical structure representation of an image;

FIG. 5(a) is a diagram showing the surface approximation of an in-region image in which coordinates are aligned with the space axis of an image.

FIG. 5(b) illustrates the space region approximated with plural triangular surfaces.

FIG. 5(c) illustrates a vector depicting the difference between the original image and the approximated image.

FIG. 6 is a block diagram showing an image compressing system.

DESCRIPTION OF THE PREFERRED EMBODIMENTS

Figure 1:
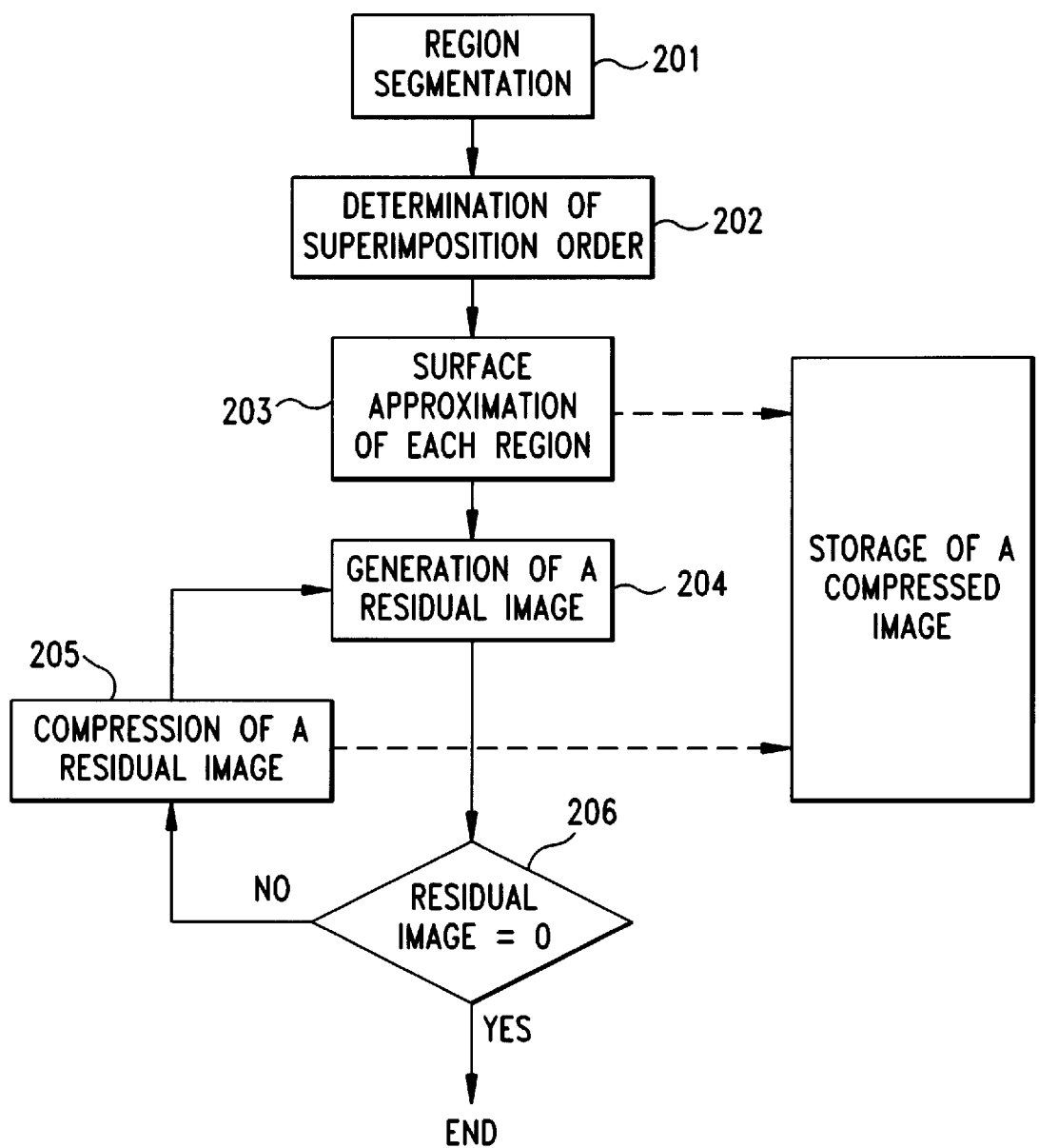
FIG. 1 is a flowchart showing an image compressing method.
Figure 2:
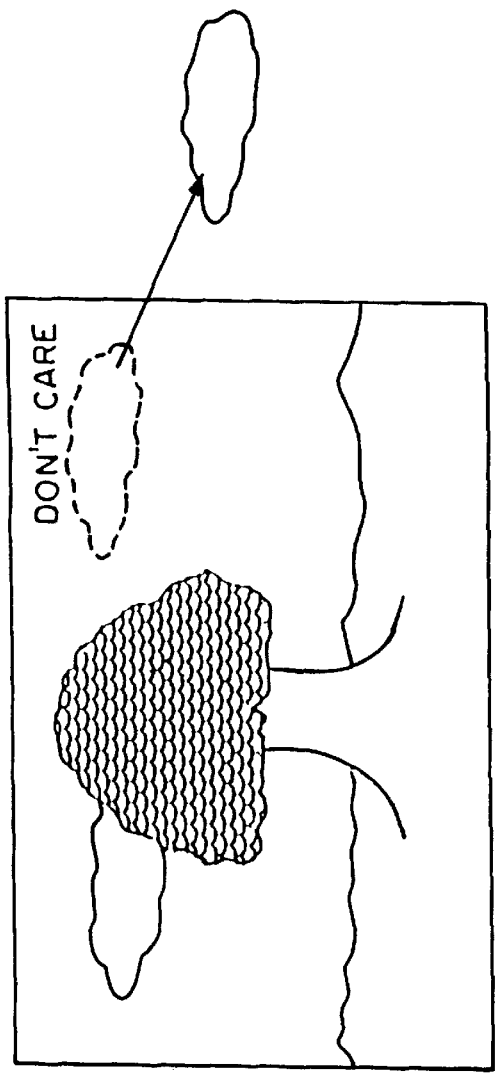
FIG. 2 is a diagram showing a two-dimensional projected image obtained by projecting a three-dimensional scene.

FIG. 1 is a flowchart showing an image compressing method of an embodiment of the present invention. FIG. 2 is a diagram showing a two-dimensional projected image obtained by projecting a three-dimensional scene. The projected image is constituted of the sky, a grass, clouds, a tree, and leaves. The procedure in the present embodiment will hereinafter be described while referring to FIG. 2 as needed.

Region Segmentation (step 201)

An original image is segmented into a plurality of object regions in which pixels have a predetermined correlation. That is, the image shown in FIG. 2 is segmented into a plurality of object regions, such as the sky, a grass, clouds, a tree, and leaves. The reason why the original image is segmented in such a manner is that highly efficient data compression is expected, because the correlation between the pixels in the same region is relatively strong and the correlation between the pixels in different regions is relatively weak.

The region segmentation can be performed by grouping the adjacent pixels where the intensity of luminance and the chrominances of the pixels are within a predetermined range. In addition to this method, there are various methods such as a method using comparisons of textures.

Determination of Superimposition Order of Object Regions (step 202)

A hierarchical structure describing a superimposition order between the overlapped object regions is generated. The object regions other than the bottom object region, the superimposition order of which is lowest, has information about its contour configuration. This embodiment uses a layered image representation such as described hereinafter.

The layered image representation represents an input motion image sequence in which two-dimensional layers describing its attributes, for example, an intensity of luminance, an opacity, a motion are spaciously superimposed with one another. The respective layers may be constituted so as to has, for example, three kinds of maps described as follows.

(1) Luminance Map

The luminance map represents textures that are addictively handled in each point of the layer.

(2) Alpha Map

The alpha map specifies the opacity or transparency of each point of the layer. This map defines the rule of superimposition between layers. The layers are superimposed in order of depth, and according to this superimposition rule, images are synthesized considering a general hiding relationship, including shadowed portions and highlighted portions, as positive.

(3) Velocity Map

The velocity map specifies how a certain layer is deformed with time. In the case where a time change in the layer cannot be sufficiently captured with the velocity map alone, there may be additionally used a delta map. This map represents a time change of the intensity of luminance for time-updating the luminance map.

Note that the basic items about the layered image representation are described in "Television Journal, Vol. 49, No. 49, pp. 523–534 (1995)."

In step 202, a part of the low-ranking object region covered by the high-ranking object region is an arbitrary data region. Specifically, in case the upper object region (cloud, for example) is removed from the layer structure, there becomes to exist a blank portion in a part of lower object region (sky, for example) corresponding to the removed the upper object. Because the blank portion is behind the upper object region, in practice, the portion may be supplemented with any data. Thus, this region is supplemented with any data, which becomes advantageous in data compression, as an arbitrary data region. Specifically, the arbitrary data region is supplemented with data such that the peripheral region of the contour line of the upper object region is extended so as to approximate with the largest triangular patch described later.

The reason for providing an arbitrary data region is not only to compress and regenerate a motion image advantageously but also to compress the lower object region effectively.

Figure 3:
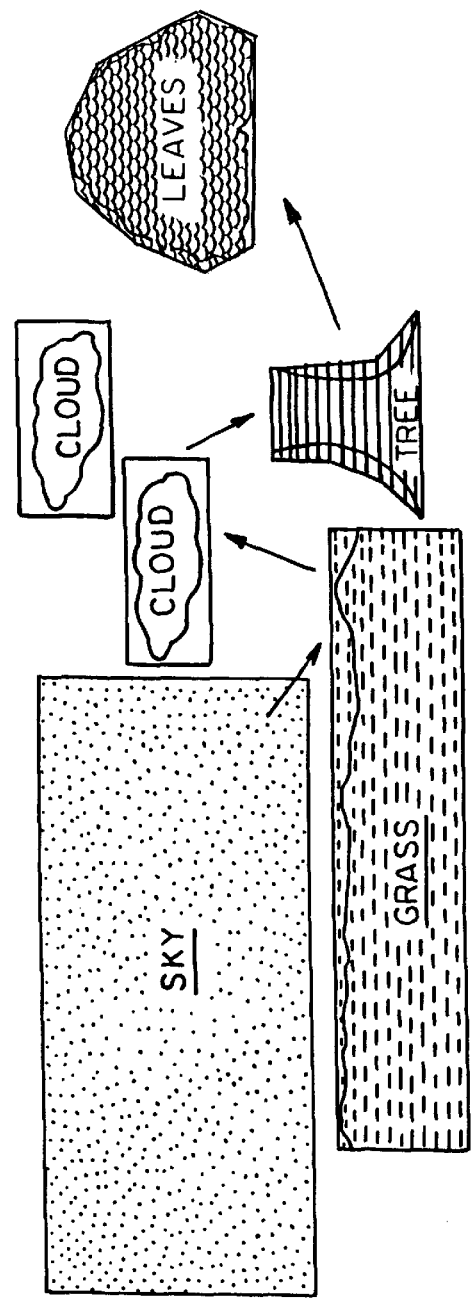
FIG. 3 is a diagram used to explain the protrusion of a certain layer from the contour.

In addition, a certain object region allows the upper object region to protrude from its contour configuration. FIG. 4 is a diagram showing the protrusion of a certain object region from the contour configuration. In this figure, if a certain object region is expressed along curves which are the contour configuration of the object region, then a large number of triangles having the same element in the vicinity of the contour will have to be used. However, if a method allowing an object region to protrude from its contour is used, the curved contour line can he expressed with a fewer number of triangles. In addition, the upper layer has information about the contour configuration, and therefore, even if the region protruding from the contour configuration were generated, only the information about the interior of the contour could be superimposed on low-ranking layers when the upper and the lower layers are actually superimposed and regenerated. FIG. 3 schematically illustrates the hierarchical structure representation of the image of FIG. 2.

Surface Approximation in Regions (step 203)

The respective regions segmented in steps 201 and 202 are approximated so that the errors of the intensity of luminance and the chrominances are within a certain threshold value. The representation of the interior of the region is approximated with a polygon (preferably, triangle). For the representation of the region, a quadtree structure has hitherto been said to be suitable for the representation of the interior of a computer from the standpoint of memory efficiency, but if an image is represented with a regular rectangular, block artifacts will take place. Then, to avoid the artifacts, the surface approximations of a intensity of luminance and chrominances are performed with triangular patches. FIG. 5 is a diagram showing the surface approximation of an in-region image.

In FIG. 5(a), x-y coordinates are aligned with the space axis of an image, the luminance intensity Y of a certain space region is represented with height, and chrominances Cb and Cr are represented with vectors. Based on this, the space region is approximated with a plurality of triangular surfaces so that the errors of the luminance intensity and the chrominances become less than a predetermined threshold value, and the results are shown in FIG. 5(b). Specifically, a region less than a certain threshold value is approximated with a triangular surface, and furthermore the image is approximated with a surface model so that the continuity between adjacent surfaces is maintained. This single triangular surface is a region where the pixels thereof all correlate with one another, and the aforementioned object region is to be formed with this signal triangular surface or a plurality of triangular surfaces.

Generation of Residual Images (step 204)

The approximated region image can be obtained by approximating a certain region and a residual region image can be also obtained by subtracting the original image from the approximated region image, because the surface approximation was already performed in step 203. The difference between the original image (FIG. 5(a)) and the image approximated with a surface model (FIG. 5(b)) is shown by a vector in FIG. 5(c). The residual region image is called the first-order residual image.

Compression of Residual Images (step 205)

The residual image is added to the approximated image. In the case of the surface approximation of a region, the structure of the image can be recognized, but the natural texture that the original image has cannot be obtained. Therefore, it becomes necessary to add the residual image to the approximated image to obtain a real texture. The residual region image is generated in all regions, and the residual region images in all regions are collected. Let the collected images be a first-order residual image. Because the pixels of the first-order residual image are suppressed within the threshold value at the time of generation, the gradation of the first-order residual becomes level lower than that of the original image. In the original image, the correlation is strong inside the region but weak outside the region. On the other hand, the residual image has a high possibility that there is no correlation inside and outside the region. However, the manner in which the residual image appears is the same as a remote partial region, and it is considered that a plurality of residual images exist in the remote partial region. For this reason, a conventional method of encoding all of the residual images can be utilized without considering regions.

In this embodiment, the conventional image compressing method can utilize a conventional vector quantization method, predictive encoding method, etc. In the present embodiment the first-order residual image is compressed high in compressibility but lossy, and consequently, even if the compressed first-order residual image were regenerated and added to the approximated image, the resultant image would not become equal to the original image. Then, the compressed first-order residual image is decompressed, and a second-order residual image is obtained from the difference between the decompressed first-order residual image and the first-order residual image. The compressed data of the first-order residual image as the second order residual image. The intensity level of the pixels of the second-order residual image becomes low compared with the first-order residual image. Therefore, there exists n and if this operation is repeated n times, all pixels of the (n+1)th-order residual image become zero. This is because, when all pixels are within a level of 1 gradation, all patterns can be represented with a code book by a method based on vector quantization. If the residual images up to the last nth-order are stored, then a lossless image can be regenerated.

Judgment of Whether a Residual Image is Zero (step 206)

A high-order residual image is obtained in sequence by repeating the aforementioned operation. If the aforementioned operation is repeated n times, in the (n+1)th-order residual image all pixels will become zero and then the compression will be ended. This is because, when all pixels are within 1 level of intensity, all patterns can be represented with a code book by a method based on vector quantization. If the residual images up to the last nth-order are stored, then a lossless image can be regenerated.

If the surface approximated image and the kth residual image is thus specified, users can decode the picture quality of the regenerated image in multiple stages. For example, when a motion image or a still image is searched for at a high speed, the surface approximated image and the first-order residual image can be used in most cases because the picture quality does not always need to be high. However, when an image stands still, or a desired still image is found, an image of high quality can be represented with the use of a high-order residual image. Furthermore, when necessary, such as when printing, an original image can be completely restored to the original state with the use of the residual images up to the nth-order.

In the image compressing method shown in the embodiment of the present invention, the surface approximation of the object region representing the contour line of an image can be represented with a parameter of a polygon, and consequently, the image compressing method is characterized in that users do not depend upon the resolution of a display unit and also in that users can select picture quality and a quantity of data in multiple stages and the selection is scalable. The "scalable" used herein means that data of higher picture quality can be decoded by further adding data to compressed data that can be decoded.

FIG. 6 shows a block diagram of an image compressing system of the present embodiment. Initially image data is input to an image input section 61. Then, the data, output from the image input section, is input to hierarchical structure deciding means 62, in which the data is segmented into a plurality of object regions where each region pixels all correlate with one another and a hierarchical structure of the object regions is decided. Each of the object regions is then approximated by plural polygonal surfaces means 63 so that the errors of the luminance intensity and the chrominances are less than a predetermined threshold value.

The difference between the original image and the surface approximated image is obtained by residue calculating means 64. This difference is a first-order residual image. The first-order residual image is then coded and compressed by compression means 65. The surface approximated image and the coded first-order residual image are stored in storage means 66. Furthermore, the compressed first-order residual image is decompressed by decompression means 67. In the residue calculating means 64, a second-order residual image is obtained from the difference between the decompressed image and the first-order residual image, and the compression result of an image obtained by compressing and decompressing the Kth-order residual image is stored.

Finally, a description will be made of a method of decoding the digital image coded by the method of the present embodiment. Initially, the surface approximated data, obtained by segmenting an original image into object regions each having a predetermined correlation, determining a hierarchical structure of the object regions, and approximating each of the object regions with one or more triangular surfaces so that the errors of the luminance intensity and the chrominances are less than a predetermined threshold value, is decoded. Then, the decoded surface approximated data is displayed on the display screen. With this display, users would understood the rough contents of the display screen.

Next, the first-order residual image data, obtained by calculating the difference between the original image and the surface approximated image, is decoded. The decoded first-order residual image data is added to the decoded surface approximated data. Then, the result is shown in the is display screen. The displayed image is naturally higher in picture quality than the image based only on the surface approximated data.

The second-order residual image data, obtained from the difference between the image obtained by decompressing the compressed first-order residual image and the first-order residual image, is decoded. The decoded second-order residual image data is added to the decoded surface approximated data and the decoded first-order residual image data. The result is then displayed on the display screen. The displayed image becomes higher in picture quality.

The high-order residual image data, obtained by recursively executing the aforementioned procedure, is decoded. The decoded high-order residual image data is added to the displayed image, i.e., the image obtained by the decoded surface approximated data and a plurality of residual image data. Thus, by recursively decoding higher-order residual image and adding the decoded image to the already displayed image data, the original image can finally be regenerated.

While the decoding method has been roughly described, the detailed description is omitted, because the concrete contents are in common with the encoding method. As occasion demands, the reader is referred to the description of the aforementioned encoding method.

As has been described hereinbefore, the present invention is constructed such that users can select picture quality and a quantity of data in multiple stages and that data of higher picture quality can be decoded by scalable selection, i.e., by further adding data to compressed data that can be decoded.

We claim:

1. A method of compressing image data, comprising the steps of:
   (a) segmenting an original image into a plurality of object regions, pixels in a same object region having a predetermined correlation with each other, said object regions also having an order of superimposition defining a hierarchy of said object regions, the original image being obtainable from the object regions by superimposing said object regions on each other in the superimposition order;
   (b) approximating each of said object regions with at least one polygonal surface such that errors of intensities of luminance and chrominances in each approximated object region are less than a predetermined threshold value;
   (c) obtaining a first-order residual image by superimposing the approximated object regions to form an approximated image and subtracting the approximated image from said original image; and
   (d) encoding said first-order residual image.

2. The method as set forth in claim 1 and further comprising the step of:
   (e) obtaining a second-order residual image by subtracting an image obtained by decompressing the encoded first-order residual image from said first-order residual image.

3. The method as set forth in claim 2, and further comprising:
   (f) recursively executing said step (d) and step (e) to obtain high-order residual images in sequence.

4. The method as set forth in claim 1, wherein each of said object regions comprises a plurality of pixels correlating with each other with respect to luminance, chrominance or texture.

5. The method as set forth in claim 1, wherein said polygonal surface is a triangular surface.

6. The method as set forth in claim 1, wherein each of said approximated object regions other than the approximated object region whose superimposition order is lowest includes information about its contour configuration.

7. The method as set forth in claim 1, wherein in said step (b) said object region is approximated with a plurality of said polygonal surfaces so that the errors of intensities of luminance and chrominances in each of said polygonal surfaces are less than a predetermined threshold value.

8. A method of compressing image data, comprising the steps of:
   (a) segmenting an original image into a plurality of object regions on the basis of a predetermined correlation so as to define a hierarchical structure of said object regions;

(b) approximating each of said object regions with at least one polygonal surface so that errors of intensities of luminance and chrominances in each said object region are less than a predetermined threshold value;

(c) obtaining a first-order residual image by subtracting the approximated image from said original image; and (d) encoding said first-order residual image, wherein each of said object regions other than the object region whose superimposition order is lowest has information about its contour configuration, and wherein data is supplemented in a corresponding area, in one object region, said corresponding area corresponding to an area where the other object region exists, said other object region being upper over said one object region, whereby said one object region is approximated with the polygonal surface independently of the contour configuration of said other object region.

9. A method of compressing image data, comprising the steps of:

(a) segmenting an original image into a plurality of object regions on the basis of a predetermined correlation so as to define a hierarchical structure of said object regions;

(b) approximating each of said object regions with at least one polygonal surface so that errors of intensities of luminance and chrominances in each said object region are less than a predetermined threshold value;

(c) obtaining a first-order residual image by subtracting the approximated image from said original image; and (d) encoding said first-order residual image, wherein each of said object regions other than the object region whose superimposition order is lowest has information about its contour configuration, and wherein the object region having said information about the contour configuration is approximated with a plurality of the polygonal surfaces protruding from said contour configuration.

10. A system for compressing image data, comprising:

means for segmenting an original image into a plurality of object regions in which pixels in a same object region have a predetermined correlation with each other, said object regions also having an order of superimposition defining a hierarchy of said object regions, the original image being obtainable from the object regions by superimposing said object regions on each other in the superimposition order;

means for approximating each of said object regions with at least one polygonal surface such that errors of intensities of luminance and chrominances in each approximated object region are less than a predetermined threshold value;

means for obtaining a first-order residual image by superimposing the approximated object regions to form an approximated image and subtracting the approximated image from said original image;

means for compressing the first-order residual image by encoding;

means for storing said approximated image and the coded first-order residual image; and means for obtaining a second-order residual image by subtracting an image obtained by decompressing the compressed first-order residual image from said first-order residual image.

11. The system as set forth in claim 10, wherein each of said object regions comprises a plurality of pixels correlating with each other with respect to luminance, chrominance or texture.

12. A method of decoding image data, comprising the steps of:

(a) segmenting an original image into a plurality of object regions, pixels in a same object region having a predetermined correlation with each other, said object regions also having an order of superimposition defining a hierarchy of said object regions, the original image being obtainable from the object regions by superimposing said object regions on each other in the superimposition order, and decoding compressed approximated data obtained by approximating each of said object regions with at least one polygonal surface such that errors of intensities of luminance and chrominances in each approximated object region are less than a predetermined threshold value;

(b) decoding compressed first-order residual image data obtained by superimposing the approximated object regions to form an approximated image and subtracting the approximated image from said original image; and (c) adding the decoded first-order residual image data to the decoded approximated data.

13. The method as set forth in claim 12, further comprising:

(d) decoding compressed second-order residual image data obtained by subtracting an image obtained by decompressing the compressed first-order residual image from said first-order residual image; and (e) adding the decoded second-order residual image data to the decoded approximated data and the decoded first-order residual image data.

14. The method as set forth in claim 12, further comprising:

(f) recursively executing said step (d) and said step (e) to decode high-order residual image data and add the decoded high-order residual image data to the already decoded approximated data and the already decoded residual image data.

15. The method as set forth in claim 12, wherein each of said object regions comprises a plurality of pixels correlating with each other with respect to luminance, chrominance or texture.

\* \* \* \* \*